(12) United States Patent
Lin

(10) Patent No.: US 10,649,893 B2
(45) Date of Patent: May 12, 2020

(54) NAMESPACE PLANNING OF NON-VOLATILE MEMORY OF DATA STORAGE DEVICE

(71) Applicant: Silicon Motion, Inc., Jhubei, Hsinchu County (TW)

(72) Inventor: Sheng-Liu Lin, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/155,044

(22) Filed: Oct. 9, 2018

(65) Prior Publication Data

US 2019/0114257 A1     Apr. 18, 2019

Related U.S. Application Data

(60) Provisional application No. 62/633,120, filed on Feb. 21, 2018, provisional application No. 62/571,339, filed on Oct. 12, 2017.

(30) Foreign Application Priority Data

Sep. 6, 2018   (TW) .............................. 107131283 A

(51) Int. Cl.
*G06F 12/02*    (2006.01)
*G06F 3/06*     (2006.01)
*G06F 12/14*    (2006.01)

(52) U.S. Cl.
CPC ........ *G06F 12/0246* (2013.01); *G06F 3/0604* (2013.01); *G06F 3/0614* (2013.01); *G06F 3/0673* (2013.01); *G06F 12/0253* (2013.01); *G06F 12/1441* (2013.01); *G06F 2212/1016* (2013.01); *G06F 2212/7201* (2013.01); *G06F 2212/7205* (2013.01); *G06F 2212/7208* (2013.01); *G06F 2212/7211* (2013.01)

(58) Field of Classification Search
CPC .. G06F 12/0246; G06F 3/0604; G06F 3/0614; G06F 3/0673
See application file for complete search history.

(56) References Cited

U.S. PATENT DOCUMENTS

| 8,230,160 | B2 | 7/2012 | Yeh |
| 8,447,920 | B1 | 5/2013 | Syu |
| 9,009,441 | B2 | 4/2015 | Chen et al. |
| 9,043,531 | B2 * | 5/2015 | Calvert ............... G06F 11/1441 711/100 |
| 9,292,432 | B2 * | 3/2016 | Chu ..................... G06F 12/0246 |
| 10,338,842 | B2 * | 7/2019 | Martineau ............. G06F 3/0616 |
| 10,437,476 | B2 * | 10/2019 | Frolikov ............... G06F 3/0604 |

(Continued)

FOREIGN PATENT DOCUMENTS

TW        201730771 A      9/2017

*Primary Examiner* — Ryan Bertram
*Assistant Examiner* — Edmund H Kwong
(74) *Attorney, Agent, or Firm* — McClure, Qualey & Rodack, LLP

(57) ABSTRACT

Namespace planning of non-volatile memory that takes advantage of multi-channel accessing and considers multi-channel properties is provided. A data storage device includes a non-volatile memory and a controller. The controller accesses the non-volatile memory through multiple channels. When performing namespace planning on the non-volatile memory, the controller makes each assigned channel correspond to just one namespace.

8 Claims, 4 Drawing Sheets

(56) References Cited

U.S. PATENT DOCUMENTS

| | | |
|---|---|---|
| 2009/0240873 A1 | 9/2009 | Yu et al. |
| 2009/0327590 A1 | 12/2009 | Moshayedi |
| 2010/0262761 A1 | 10/2010 | Borchers et al. |
| 2017/0242722 A1 | 8/2017 | Qiu et al. |
| 2018/0067849 A1* | 3/2018 | Kanno ................ G06F 12/0246 |
| 2018/0121344 A1* | 5/2018 | Seo .................... G06F 12/0246 |
| 2019/0146927 A1* | 5/2019 | Frolikov ............. G06F 12/1009 711/103 |

* cited by examiner

NAMESPACE PLANNING OF NON-VOLATILE MEMORY OF DATA STORAGE DEVICE

CROSS REFERENCE TO RELATED APPLICATIONS

This application claims the benefit of U.S. Provisional Application No. 62/571,339, filed Oct. 12, 2017, and U.S. Provisional Application No. 62/633,120, filed Feb. 21, 2018, and claims priority of Taiwan Patent Application No. 107131283, filed on Sep. 6, 2018, the entirety of which are incorporated by reference herein.

BACKGROUND OF THE INVENTION

Field of the Invention

The present invention relates to data storage devices and particularly relates to namespace planning of non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

Before using a non-volatile memory in data storage, namespace planning is required first. Each command issued by a host corresponds to a namespace to be operated. For example, the host may request to read, write or erase a space of a particular namespace. How to properly plan the namespace is an important topic in the technical field.

BRIEF SUMMARY OF THE INVENTION

In the invention, namespace planning of non-volatile memory is based on operational efficiency of non-volatile memory.

A data storage device in accordance with an exemplary embodiment of the present invention has a non-volatile memory and a controller. The controller accesses the non-volatile memory through multiple channels. When performing namespace planning on the non-volatile memory, the controller makes each assigned channel correspond to just one namespace.

In an exemplary embodiment, when another namespace is requested to be created, the namespace that originally exists in the non-volatile memory is de-attached to be planned by the controller again. The controller moves data from a de-attached space to a newly-planned space.

In an exemplary embodiment, the controller assigns all channels. The total number of channels is X. The total number of namespaces is Y. Each namespace is accessed through Z channels, where Z is a quotient of dividing X by Y.

In an exemplary embodiment, according to the control of the controller, the size requirement of each namespace is equally divided to be responsible by assigned channels. The controller may set each channel to correspond to a logical address range and thereby the size requirement of each namespace is handled.

In an exemplary embodiment, the non-volatile memory is a flash memory, which is controlled by a host through a controller with the host issuing logical block addresses (LBAs). The controller sets each channel to correspond to a range of logical block address and thereby the size requirement of each namespace is handled. For each channel, the controller may use spare blocks to perform garbage collection and wear leveling. Equal-sized LBA ranges are set to correspond to the different assigned channels of the same namespace.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
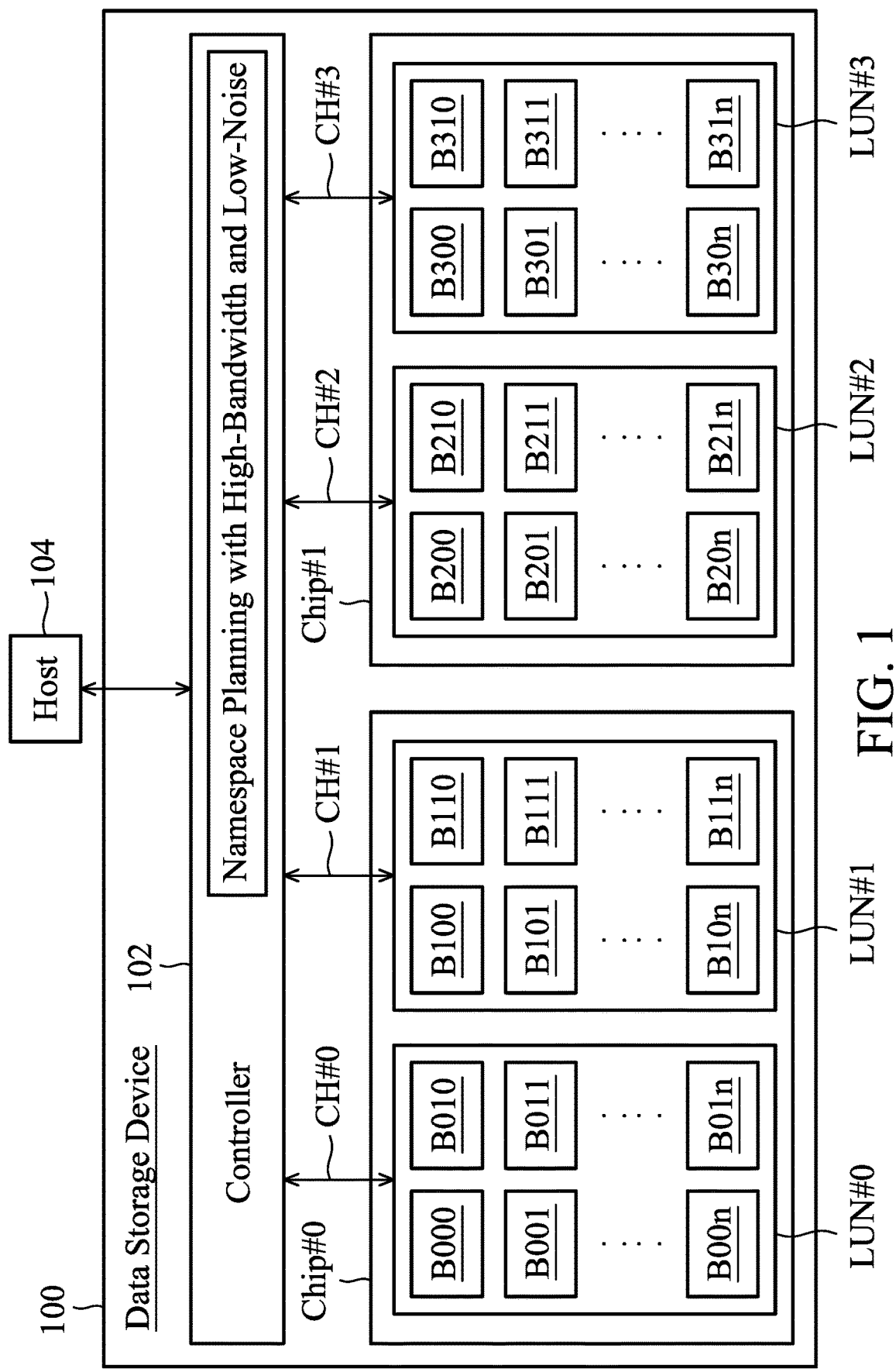
FIG. 1 depicts a data storage device 100 in accordance with an exemplary embodiment of the present invention.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion uses flash memory as an example.

Flash memory is often used as a storage medium in today's data storage devices. Flash memory is often implemented in memory cards, USB flash devices, SSDs, and so on. In another exemplary embodiment, a flash memory may be packaged with a controller to form a multiple-chip package named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with flash memories as the storage medium. For example, a server may operate an array of SSDs to form a data center. The server may be regarded as a host that operates the SSDs to access the flash memories within the SSDs.

Before using the flash memory in data storage, the host requests the controller on the device side to make a namespace planning on the flash memory. The host indicates a namespace when operating the flash memory, to read, write or erase a space of the indicated namespace. The host distinguishes the flash memory storage contents by logical addresses (for example, according to a logical block address LBA or a global host page number GHP, etc.). The logical address and the namespace have a mapping relationship. When the host requests to read, write, or erase data of a particular logical address, a namespace that the logical address maps to is obtained and the requested reading, writing or erasing is performed on the namespace. The namespace planning is based on the operational efficiency of flash memory—especially, the advantages of multi-channel accessing and operational considerations of flash memory are take into account in namespace planning.

A flash memory may be accessed through multiple channels (i.e. multi-channel accessing). Each channel involves access to a single or a plurality of planes. The access to a plurality of planes of one channel may be controlled by a single chip enable signal or controlled by multiple chip enable signals. Each plane includes a plurality of blocks. Each block includes a plurality of pages. Each page includes a plurality of sectors. The smallest unit for space erasing is the block. The complete space of one block should be erased together before being reused for data storage. In each block, pages are allocated in order from low to high physical addresses to store data. The section may be the smallest storage unit. In an exemplary embodiment, each sector preferably corresponds to 4 KB of data labeled by one logical block address (LBA). Each page is divided into eight sectors, for storage of 32 KB. Each block has 1024 pages, for storage of 32 MB. Each plane has 2K blocks, for storage of 64 GB (differentiated by 16M LBAs). The access speed is important for such a large storage space. Multi-channel accessing is a solution.

FIG. 1 depicts a data storage device 100 in accordance with an exemplary embodiment of the present invention. The controller 102 processes access commands received from the host 104 and, accordingly, accesses the flash memory through four channels CH#0 . . . CH#3. In the exemplary embodiment of FIG. 1, two flash memory chips Chip#0 and Chip#1 are provided. The flash memory chip Chip#0 includes two separate areas differentiated by logic unit numbers #0~#1 (LUN#0 and LUN#1). The flash memory chip Chip#1 includes two separate areas differentiated by logic unit numbers #2~#3 (LUN#2 and LUN#3). Logic unit numbers #0~#1 (LUN#0 and LUN#1) correspond to channels CH#0 and CH#1, and logical unit numbers #2~#3 (LUN#2 and LUN#3) correspond to channel CH#2 and CH#3. Logic unit number #0 (LUN #0) relates to access of two planes: one plane includes blocks B000, B001 . . . B00n, and the other plane includes blocks B010, B011 . . . B01n. Logic unit number #1 (LUN #1) relates to access of two planes: one plane includes blocks B100, B101 . . . B10n, and the other plane includes blocks B110, B111 . . . B11n. Logic unit number #2 (LUN #2) relates to access of two planes: one plane includes blocks B200, B201 . . . B20n, and the other plane includes blocks B210, B211 . . . B21n. Logic unit number #3 (LUN #3) relates to access of two planes: one plane includes blocks B300, B301 . . . B30n, and the other plane includes blocks B310, B311 . . . B31n. The controller 102 may access the eight planes through the four channels CH#0 . . . CH#3. Different channels CH#0 . . . CH#3 may transfer data in parallel. The two planes sharing the same channel may be accessed in an interleaving way. Compared to multi-channel accessing, concentrated accessing through a specific channel significantly affects the operational efficiency of the data storage device 100. The controller 102 responds to a namespace creation command requested by a host 104 considering the advantages of multi-channel accessing and operational considerations of flash memory, and thereby a high-bandwidth and low-noise design is achieved. The high bandwidth is due to the multi-channel accessing. Because it is avoided to concentrate accessing through any specific channel, the operational noise is suppressed. The details are as follows.

Figure 2:
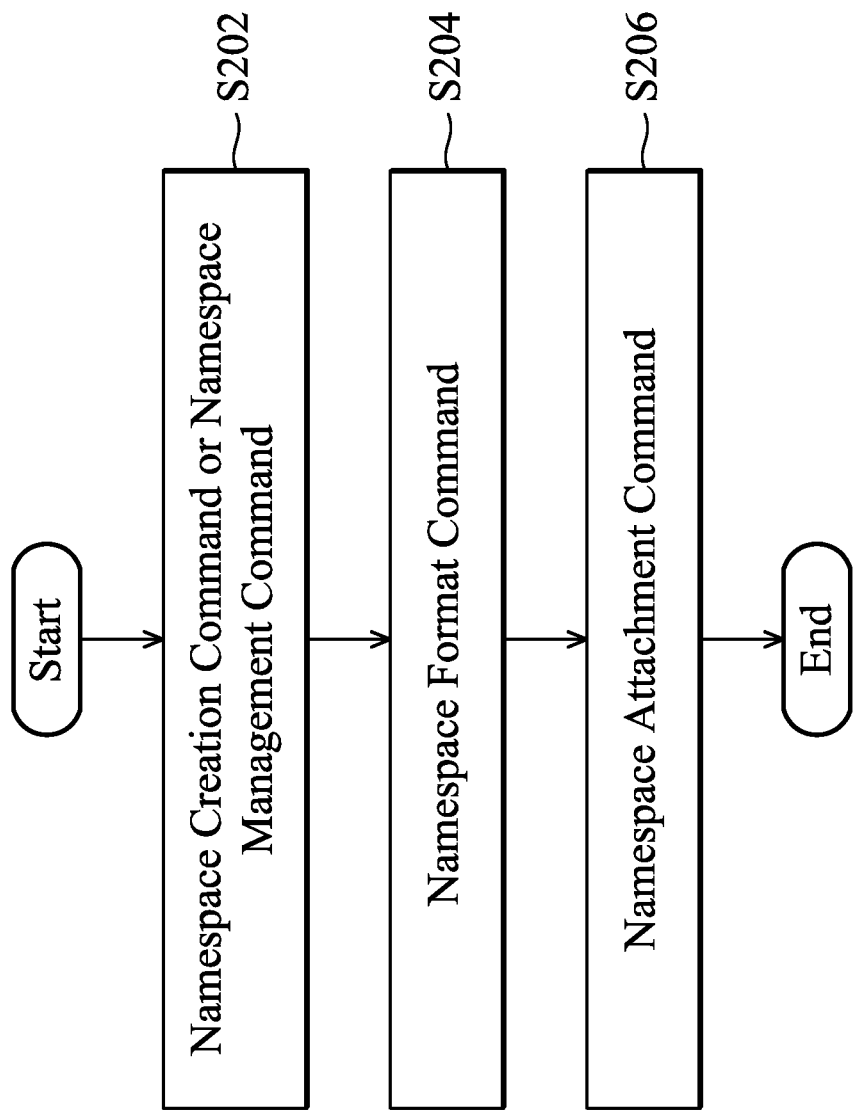
FIG. 2 is a flowchart depicting how the host 104 requests namespace planning in accordance with an exemplary embodiment of the present invention.

FIG. 2 is a flowchart depicting how the host 104 requests namespace planning in accordance with an exemplary embodiment of the present invention. In step S202, the host 104 issues a namespace creation command or a namespace management command to establish a namespace. The namespace creation/management command indicates a namespace parameter, e.g., a namespace size or capacity. The namespace size or capacity is preferably represented by an amount of logical blocks, and thereby the size of an LBA range corresponding to the established namespace is known. In a case wherein each logical block address (LBA) corresponds to one logical block that can store 4 KB of data, the namespace size or capacity may be the product of the logical block amount and 4 KB. The controller 102 plans the flash memory to establish a namespace in step S202 to achieve the high-bandwidth and low-noise design. Step S204 is optional, for the host 104 to issue a namespace format command to change or modify the namespace parameter. For example, the size of each logical block may be modified from 4 KB to 16 KB. In step S206, the host 104 issues a namespace attachment command to attach the namespace to the data storage device 100 as an accessible space.

Figure 3A:
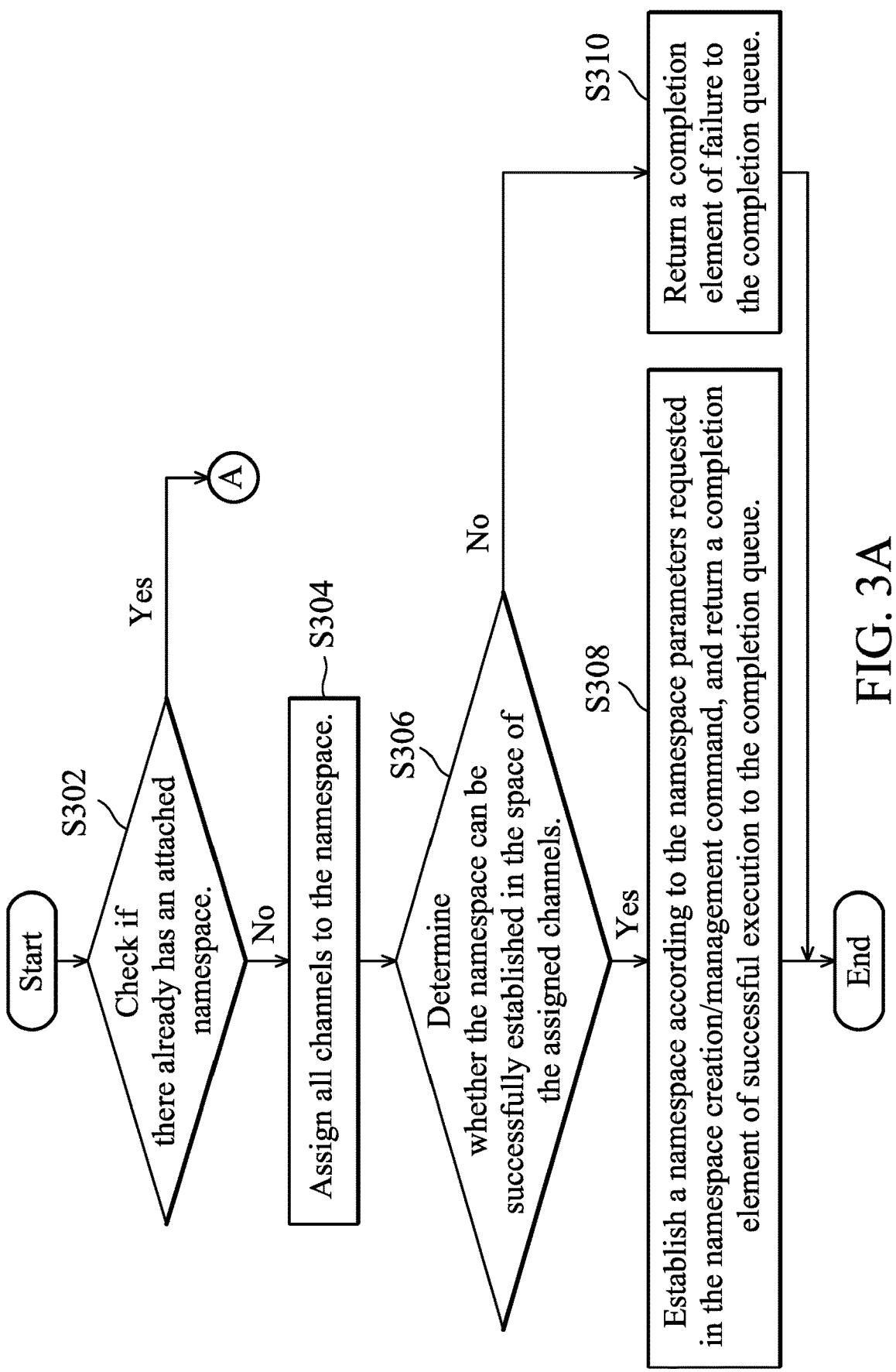
FIG. 3A and FIG. 3B show a flowchart of a method for establishing a namespace in accordance with an exemplary embodiment of the present invention, which may be performed to respond to a namespace establishment/management command issued by the host 104 in step S202.
Figure 3B:
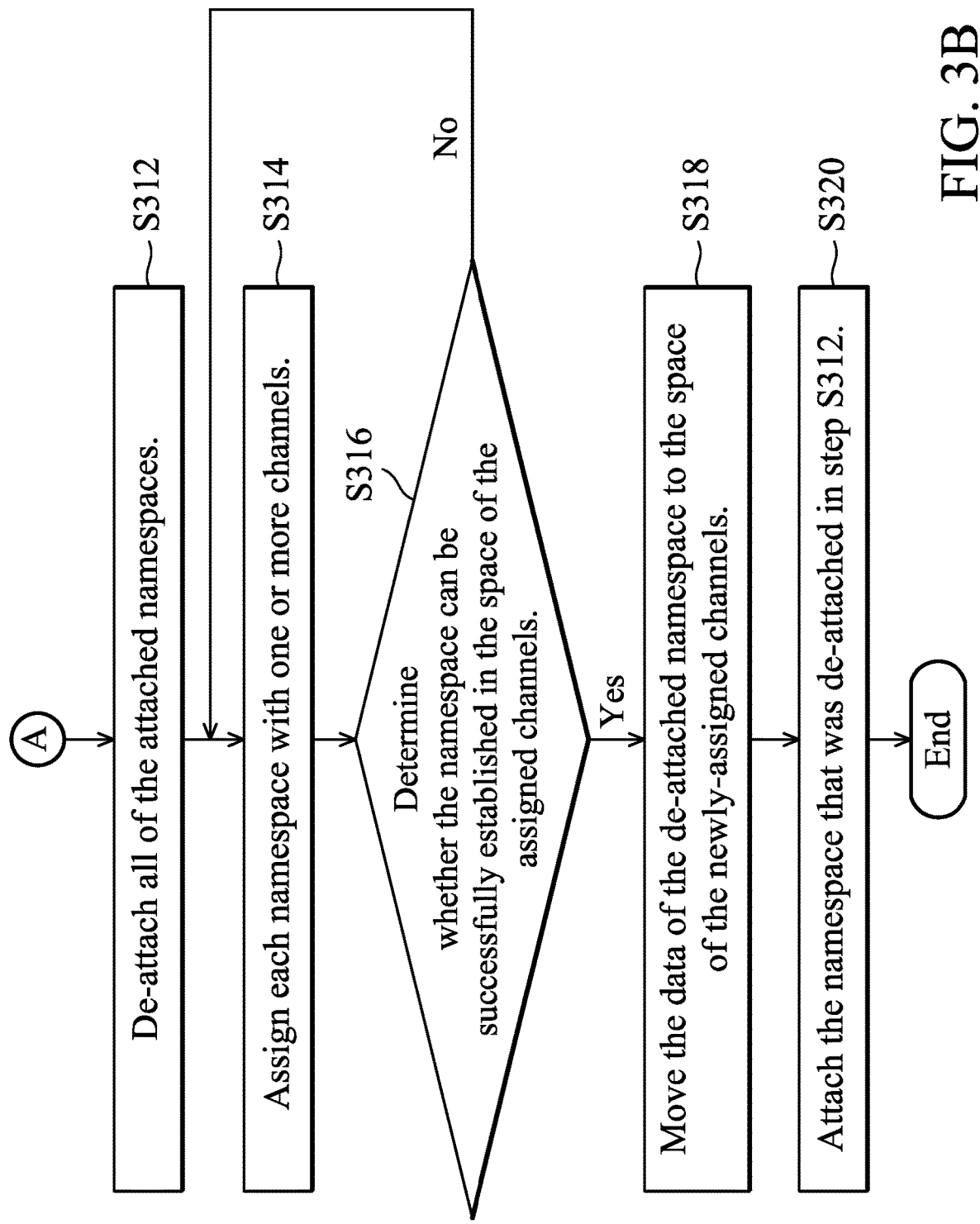

FIG. 3A and FIG. 3B show a flowchart of a method for establishing a namespace in accordance with an exemplary embodiment of the present invention, which may be performed to respond to a namespace establishment/management command issued by the host 104 in step S202. The namespace creation/management command issued by the host 104 in step S202 may be pushed to a submission queue to be fetched and executed by the controller 102 and thereby the namespace establishment method is performed. Then, the controller stores a completion element to a completion queue to notify the host 104 whether the namespace creation/management command has been successfully executed. If the execution is successful, the host 104 proceeds to perform step S204.

Referring to step S302 of FIG. 3A, after fetching a command from the command queue, the controller 102 checks if there already has an attached namespace. If not, step S304 is performed. If yes, step S312 of FIG. 3B is executed.

In step S304, the controller 102 assigns all channels to the namespace. When there is no attached namespace at present, the currently established namespace is number #0. The controller 102 allocates all of the four channels CH#0~#3 to the namespace #0. The established namespace may be assigned a number by the controller 102 or by the host 104.

In step S306, the controller 102 determines whether the namespace can be successfully established in the space of the assigned channels. In an exemplary embodiment, the data storage space of the flash memory is 512 GB (128M logical blocks). The controller 102 accesses the data storage space of the flash memory through four channels CH#0~#3. The data storage space corresponding to each channel CH is 128 GB (32M logical blocks). The controller 102 determines whether the namespace size or capacity requested in the namespace creation/management command is less than 128M logical blocks. For example, when the namespace size or capacity requested in the namespace creation/management command to create the namespace #0 is 16M logical blocks, the space accessed through the channels CH#0~#3 is enough to establish the namespace #0 and then step S308 is performed. In step S308, the controller 102 establishes the namespace #0 according to the namespace parameters requested in the namespace creation/management command, and returns a completion element of successful execution to the completion queue. When the number, #0, of the namespace #0 is assigned by the controller 102, 0x00 representing the namespace #0 is filled in the completion element. In the exemplary embodiment, the channels CH#0~#3 are each responsible for data storage of 4M logical blocks of the namespace #0. The size requirements of each namespace may be evenly shared out to be responsible by the assigned channels. When the controller 102 cannot be established in the space of the assigned channels, it means that the flash memory does not have enough data storage space to establish the requested namespace and step S310 is performed.

In step S310, the controller 102 returns a completion element of failure to the completion queue. The execution of step S202 fails. The host 104 may adjust the namespace parameters to repeat step S202 again, or execute an error detection program to determine why step S202 failed.

When it is determined in step S302 that there is a namespace already attached for data storage (e.g., detecting a namespace #0 already attached for data storage when another namespace #1 is requested to be established), as linked to FIG. 3B through terminal A, the steps of FIG. 3B are performed. In step S312, the controller 102 de-attaches all of the attached namespaces. After de-attaching the namespace #0 by step S312, all namespaces #0~#1 are in an unattached state.

In step S314, the controller 102 assigns each namespace with one or more channels. The controller 102 preferably evenly assigns all channels to establish all namespaces. In another exemplary embodiment, each namespace is assigned with just one single channel. In an exemplary embodiment, the controller 102 preferably equally assigns the four channels CH#0~#3 to the two namespaces #0~#1. Every two channels correspond to one namespace. For example, channels CH#0 and CH#1 are assigned to namespace #0, and channels CH#0 and CH#1 are assigned to namespace #1. In another exemplary embodiment wherein each namespace is assigned with just one single channel, the controller 102 assigns one single channel CH#0 to namespace #0 and one single channel CH#1 to namespace #1.

In step S316, the controller 102 determines whether the namespace can be successfully established in the space of the assigned channels. If yes, step S318 is performed. If not, step S314 is performed. In an exemplary embodiment, the namespace size or capacity requested in the namespace creation/management command for establishing namespace #0 is 64 GB (16M logical blocks), and the namespace size or capacity requested in the namespace creation/management command for establishing namespace #1 is 160 GB (40M logical blocks). When the controller 102 assigns channels CH#0 and CH#1 to namespace #0 and assigns channels CH#2 and CH#3 to namespace #1, both namespaces #0 and #1 can be established successfully and then step S318 is performed. When the controller 102 assigns just one single channel CH#0 to namespace #0 and assigns just one single channel CH#1 to namespace #1, the namespace #0 may be established successfully but the establishment of the namespace #1 may fail. Step S314 is performed again.

When step S314 is performed again, the controller 102 reassigns the channels to the namespaces. In an exemplary embodiment, just one single channel CH#0 is assigned to the namespace #0 and two channels CH#1 and CH#2 (or even three channels CH#1~#2) are assigned to the namespace #1. It is determined in step S316 that the namespaces #0 to #1 can be successfully established in the space of the assigned channels. Step S318 is performed.

In step S318, the controller 102 moves the data of the de-attached namespace to the space of the newly-assigned channels. Then, the flow ends, and a completion element of successful execution is written to the completion queue. In an exemplary embodiment, the namespace #0 originally assigned with all of the four channels CH#0~#3 is assigned with just two channels CH#0~#1 now. The controller 102 moves the data of the namespace #0 from the space of the channels CH#2 and CH#3 to the space of the channels CH#0 and CH#1. In another exemplary embodiment, the namespace #0 originally assigned with all of the four channels CH#0~#3 is assigned with just one single channel CH#0 now. The controller 102 moves the data of the namespace #0 from the space of the channels CH#1, CH#2, and CH#3 to the space of the channel CH#0. According to the data movement, the controller 102 updates the logical-to-physical mapping table.

In step S320, the controller 102 attaches the namespace that was de-attached in step S312. Taking the above as an example, the namespace #0 that was de-attached in step S312 is re-attached to the data storage device 100 now.

In other exemplary embodiments, the detecting step S302 of FIG. 3A for the attached namespace and de-attaching step S312 of FIG. 3B for the detected namespace may be performed according to additional commands issued by the host 104.

A four channel accessing architecture is discussed as an example to show the possible conditions that may be encountered when step S202 is executed. At the beginning, no namespace is attached to the data storage device 100. When the namespace parameters are workable at the first time step S202 is performed, the controller 102 successfully establishes the namespace #0 and the four channels CH#0~#3 are all assigned to the namespace #0.

At the second time step S202 is performed, the data storage device 100 already has the namespace #0 attached. Thus, step S312 is executed. The controller 102 de-attaches the namespace #0 and executes step S314 to assign the four channels CH#0~#3 to the namespace #0 and the namespace #1. When it is determined in step S316 that the namespace size of the namespace #1 is not satisfied, step S314 is performed again. For example, the controller 102 assigns just one channel CH#0 to the namespace #0 and assigns the remaining channels CH#1~#3 to the namespace #1. The size requirement of the namespaces #0 and #1 is satisfied. It is determined that the controller 102 can successfully establish the namespaces #0~#1. In step S318, the controller 102 moves the data of the namespace #0. Instead of spreading over the channels CH#0~#3, the data of the namespace #0 is concentrated in the space of the currently-assigned channel CH#0.

According to the above process, the controller 102 assigns accessing channels to each namespace in response to the namespace creation/management command issued by the host 104. The controller 102 considers the average use of multiple channels so that the planned namespace may utilize all channels (high bandwidth) but avoids sharing the same channel (low noise) by the different namespaces. In an exemplary embodiment, the namespace #0 stores the software of the operating system and the namespace #1 stores user data. When user data is requested by the operating system, the accessing is avoided from being centralized on some specific channels. The operating system and the user data accessing are operated at high speed and do not interfere with each other. In another exemplary embodiment, the namespace #0 stores confidential data and the namespace #1 stores non-confidential data. The separated accessing channels allow the host 104 efficiently managing data according to user privilege.

In some exemplary embodiments, the controller 102 assigns just one single channel to one namespace. More channels are assigned to one namespace by the controller 102 when the namespace size is not satisfied by the space of a single channel. In this example, more channels will be assigned. The unassigned channel will be assigned to a new namespace in the future.

In the above, the controller 102 determines whether a namespace can be established in the space of the assigned channel according to the namespace size or capacity (in units of logical blocks) requested as the namespace parameters. In another exemplary embodiment, the controller 102 determines whether a namespace can be established in the space of the assigned channel according to the total non-volatile memory capacity (the total NVM capacity) requested as the namespace parameters. The design is similar. In the following, only the significant differences are explained.

In step S306, the controller 102 determines whether the namespace can be established in the space of the assigned channel(s). In an exemplary embodiment, the data storage space of the flash memory is 512 GB, the controller 102 accesses the data storage space of the flash memory through four channels CH#0~#3, and the space of each channel is 128 GB. The controller 102 determines whether a non-volatile memory capacity requested in the namespace creation/management command is less than 512 GB. If yes, step S308 is performed. For example, when the namespace creation/management command for namespace #0 requests a non-volatile memory capacity of 64 GB, the flash memory has enough data storage space to create a namespace #0 so that step S308 is performed. The controller 102 establishes the namespace #0 according to the namespace parameters indicated by the namespace creation/management command, and then returns a completion element of successful execution to the completion queue.

In step S316, the controller 102 determines whether the namespace can be established in the space of the assigned channel(s). In an exemplary embodiment, the namespace creation/management command for namespace #0 requests a non-volatile memory capacity of 64 GB (16M logical blocks) and the namespace creation/management command for namespace #1 requests a non-volatile memory capacity of 160 GB (40M logical blocks). When the controller 102 assigns the channels CH#0~#1 to the namespace #0 and the channels CH#2~#3 to the namespace #1, the namespaces #0 and #1 can be successfully established. When the controller 102 assigns just one single channel CH#0 to the namespace #0 and just one single channel CH#1 to the namespace #1, the namespace #0 can be successfully established but the namespace #1 cannot be established. Step S314 is performed again. This time, the controller 102 assigns two channels CH#1 and CH#2 to the namespace #1. The namespace #1, therefore, can also be successfully established.

In an exemplary embodiment, the controller 102 makes the size requirement of each namespace to be equally shared out to be responsible by the assigned channels. The controller 102 may set each channel to correspond to a logical address range correspond and thereby the size requirement of each namespace is satisfied. The flash memory may be controlled by the host 104 through the controller 102 with the host 104 issuing a logical block address (LBA) to be accessed. The controller 102, therefore, may set each channel to correspond to a range of logical block address (an LBA range) and thereby the size requirement of each namespace is satisfied. The controller 102 may utilize the spare blocks in each channel when performing garbage collection or wear leveling procedures of the channel. Channels assigned to the same namespace may be responsible for the equal-sized LBA ranges to satisfy the size requirement of the namespace.

Namespace planning based on the aforementioned technical content is considered within the scope of the present invention. Based on the aforementioned technical content, the present invention further relates to a non-volatile memory operation method.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a non-volatile memory; and
   a controller, accessing the non-volatile memory through multiple channels, wherein:
   when performing namespace planning on the non-volatile memory, the controller makes each assigned channel correspond to just one namespace;
   when another namespace is requested to be created, a namespace originally existing in the non-volatile memory is de-attached to be planned by the controller again; and
   the controller moves data from a de-attached space to a newly-planned space.

2. The data storage device as claimed in claim 1, wherein:
   the controller assigns all channels.

3. The data storage device as claimed in claim 2, wherein:
   total number of channels is X;
   total number of namespaces is Y; and
   each namespace is accessed through Z channels, where Z is a quotient of dividing X by Y.

4. The data storage device as claimed in claim 1, wherein:
   according to the control of the controller, the size requirement of each namespace is equally divided to be responsible by assigned channels.

5. The data storage device as claimed in claim 4, wherein:
   the controller sets each channel to correspond to a logical address range and thereby the size requirement of each namespace is handled.

6. The data storage device as claimed in claim 5, wherein:
   the non-volatile memory is a flash memory, which is controlled by a host through the controller with the host issuing logical block addresses; and
   the controller sets each channel to correspond to a range of logical block address and thereby the size requirement of each namespace is handled.

7. The data storage device as claimed in claim 6, wherein:
   for each channel, the controller uses spare blocks to perform garbage collection and wear leveling.

8. The data storage device as claimed in claim 6, wherein:
   channels assigned to the same namespace are responsible for equal-sized logical block address ranges and thereby the size requirement of each namespace is handled.

* * * * *